(12) United States Patent
Kushnerik

(10) Patent No.: US 12,139,161 B2
(45) Date of Patent: Nov. 12, 2024

(54) NATURAL VACUUM SENSING FOR GARAGE PARK DETECTION

(71) Applicant: TOYOTA MOTOR NORTH AMERICA, INC., Plano, TX (US)

(72) Inventor: Michael R. Kushnerik, The Colony, TX (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 17/743,405

(22) Filed: May 12, 2022

(65) Prior Publication Data

US 2023/0365150 A1    Nov. 16, 2023

(51) Int. Cl.
*B60W 50/14*     (2020.01)
*B60W 20/00*     (2016.01)
*G01L 13/02*     (2006.01)

(52) U.S. Cl.
CPC ............ *B60W 50/14* (2013.01); *B60W 20/00* (2013.01); *G01L 13/02* (2013.01); *B60W 2050/146* (2013.01); *B60W 2510/06* (2013.01); *B60W 2510/08* (2013.01); *B60W 2555/20* (2020.02)

(58) Field of Classification Search
CPC .. B60W 20/00; B60W 50/14; B60W 2555/20; B60W 2050/146; B60W 2510/06; B60W 2510/08; G01L 13/02
See application file for complete search history.

(56) References Cited

U.S. PATENT DOCUMENTS

| | | | |
|---|---|---|---|
| 6,040,636 A | 3/2000 | Dicroce | |
| 7,228,213 B2 | 6/2007 | Sakai | |
| 9,053,626 B2 | 6/2015 | Cristoforo | |
| 10,577,850 B2 | 3/2020 | Ozkan | |
| 11,235,703 B2* | 2/2022 | Yang | B60H 1/00978 |
| 2004/0065153 A1* | 4/2004 | Lin | G01L 13/02 |
| | | | 73/716 |
| 2014/0074383 A1 | 3/2014 | Frey | |
| 2021/0003671 A1* | 1/2021 | Diehl | B60R 13/08 |

FOREIGN PATENT DOCUMENTS

| | | |
|---|---|---|
| CA | 2258884 A1 | 7/2000 |
| JP | 6455271 B2 | 1/2019 |
| KR | 20210064719 A | 6/2021 |

\* cited by examiner

*Primary Examiner* — Edwin A Young
(74) *Attorney, Agent, or Firm* — SHEPPARD, MULLIN, RICHTER & HAMPTON LLP; Daniel N. Yannuzzi

(57) ABSTRACT

Systems and methods are provided for determining whether a vehicle is located in an enclosed space based on the barometric pressure. Systems and methods may include taking pressure measurements and determining that a threshold pressure difference has been exceeded, which may suggest that the vehicle is in an enclosed space.

10 Claims, 5 Drawing Sheets

NATURAL VACUUM SENSING FOR GARAGE PARK DETECTION

TECHNICAL FIELD

The present disclosure relates generally to measuring the barometric pressure outside of a vehicle, and in particular, some implementations may relate to performing measurements before ignition of a vehicle.

DESCRIPTION OF RELATED ART

Hybrid vehicles and electric vehicles have become increasingly popular among consumers concerned with their environmental impact and with increasing fuel economy. These vehicles can have various sensors to automatically make determinations on a vehicle's environment.

BRIEF SUMMARY OF THE DISCLOSURE

According to various embodiments of the disclosed technology, a vehicle may comprise a plurality of sensors, wherein at least one sensor comprises a barometric pressure sensor; a processor; and a memory encoded with instructions executable by the processor, the instructions causing the processor to: receive a first barometric pressure reading from the plurality of sensors; determine a second barometric pressure; determine the difference between the first barometric pressure reading and the second barometric pressure; determine that the difference exceeds a threshold pressure difference value; and notify a driver of the vehicle that the vehicle is in an enclosed space.

In some embodiments the instructions further cause the processor to determine if a driver is activating the vehicle and refrain from activating the vehicle if the difference exceeds the threshold pressure difference.

In some embodiments, determining a second barometric pressure comprises receiving a second barometric pressure reading from the plurality of sensors.

In some embodiments, the instructions further cause the processor to determine if the vehicle is activated and automatically turn off the vehicle if the difference exceeds the threshold pressure difference.

In some embodiments, notifying a driver of the vehicle comprises displaying a message to the driver and providing a prompt to turn the vehicle off.

In some embodiments, the threshold pressure difference value is calculated based on the first barometric pressure reading, the second barometric pressure, and the determined time.

In some embodiments, the determined time is determined based on the vehicle's heat soak time.

In accordance with another embodiment, a method may comprise determining that a vehicle has been turned on; receiving a first barometric pressure reading from one or more sensors of the vehicle; receiving a second barometric pressure reading from the one or more sensors after a determined time; determining the difference between the first barometric pressure reading and the second barometric pressure reading; determining if the difference exceeds a threshold pressure difference value; notifying a driver of the vehicle that the vehicle is in an enclosed space; and providing a prompt to the driver of the vehicle to turn the vehicle off.

In some embodiments, the threshold pressure difference value is calculated based on the first barometric pressure reading, the second barometric pressure, and the determined time.

In some embodiments, the determined time is based on the vehicle's heat soak time.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments of the present disclosure are directed to determining whether a vehicle is in an enclosed space and determining if there is a safety concern due to operating a vehicle in such an enclosed space. Embodiments of the systems and methods disclosed herein can provide pressure measurements prior to ignition of a vehicle or during operation of a vehicle and can turn a vehicle on or off depending on the pressure measurements. It can be unsafe to operate a vehicle in an enclosed space due to the buildup of carbon monoxide from the vehicle's exhaust. The systems described herein can determine that the vehicle is in an enclosed space based on pressure using the Ideal Gas Law. In particular, the vehicle can detect a change in pressure and inform a driver that the vehicle is likely in an enclosed space. By treating an enclosed space as a vacuum, the vehicle can attribute a change in pressure to the vehicle's exhaust, signaling that the vehicle is located in an enclosed space if the pressure increases.

Figure 1:
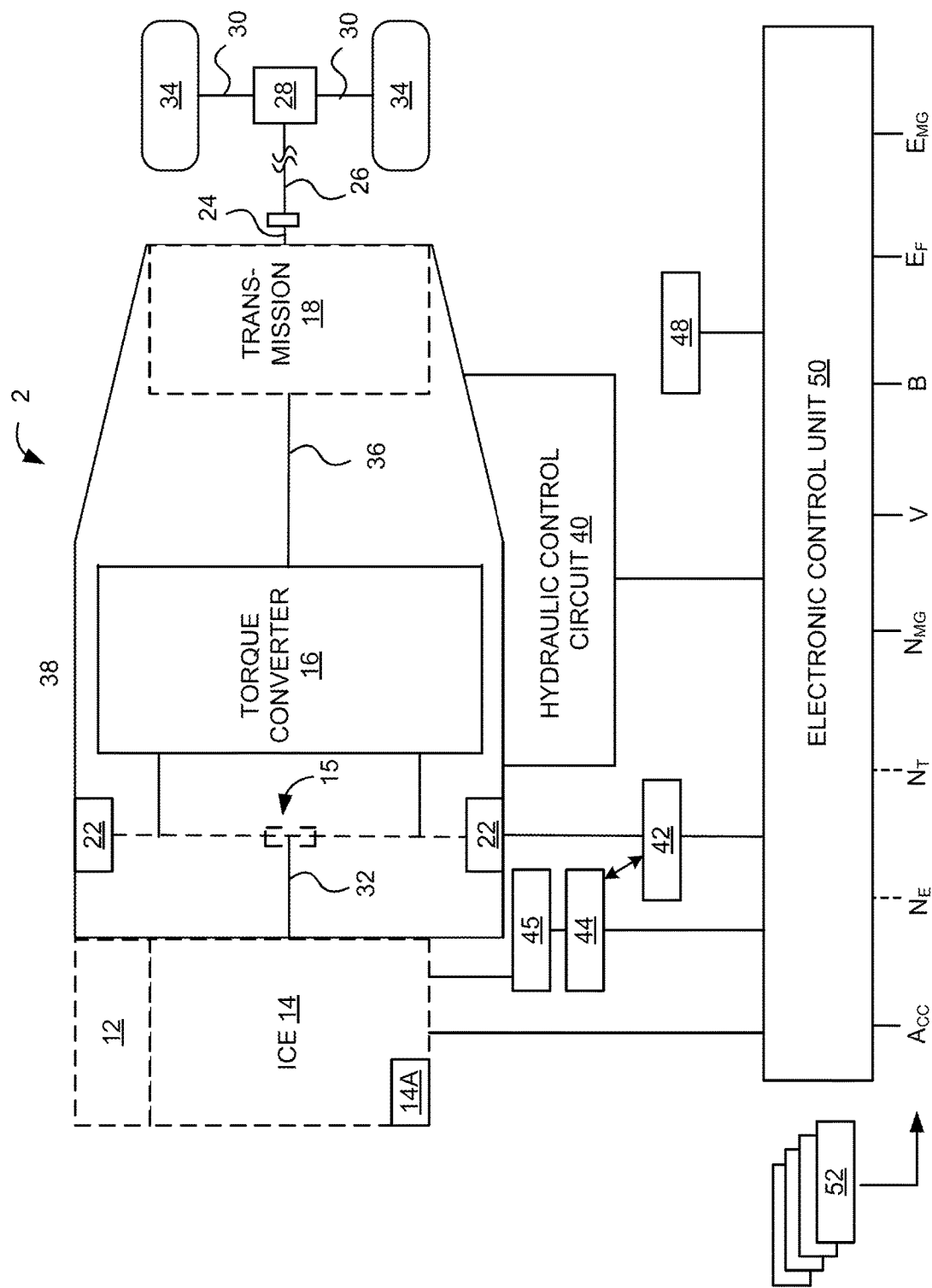
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for vacuum sensing can be implemented in other types of vehicle including gasoline- or diesel-powered vehicles, fuel-cell vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, NMS, of the motor 22 (motor rotational speed), and vehicle speed, $N_V$. These may also include torque converter 16 output, NT (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, pressure, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, barometric pressure, changes in barometric pressure, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as an example of vehicle systems with which embodiments of the disclosed technology may be implemented. One of ordinary skill in the art reading this description will understand how the disclosed embodiments can be implemented with vehicle platforms.

Figure 2:
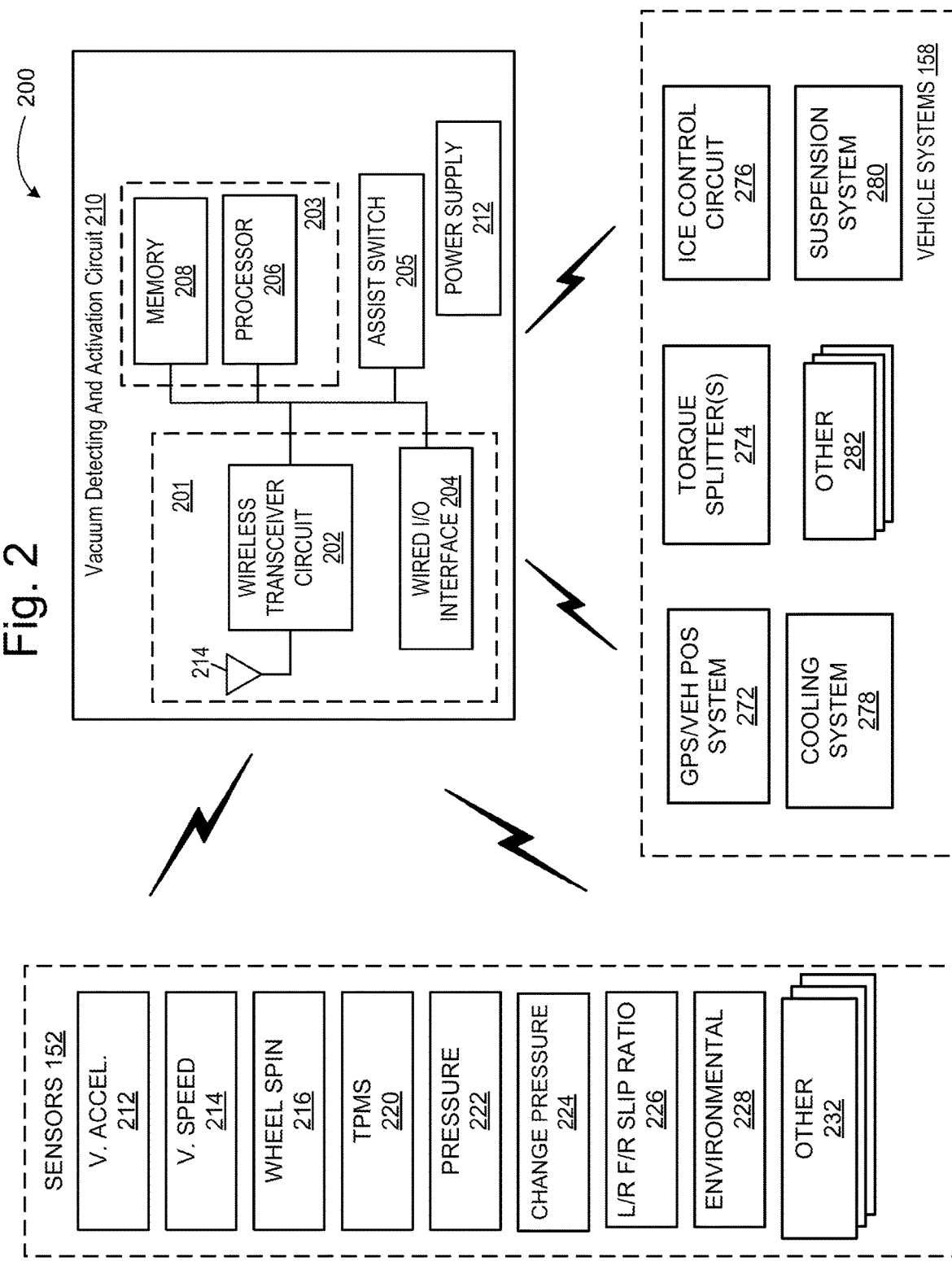
FIG. 2 illustrates an example architecture for detecting an increase in pressure and refraining from ignition in accordance with one embodiment of the systems and methods described herein.

FIG. 2 illustrates an example architecture for detecting changes in barometric pressure and adjusting systems in accordance with one embodiment of the systems and methods described herein. Referring now to FIG. 2, in this example, vacuum sensing and activation system 200 includes a vacuum detecting and activation circuit 210, a plurality of sensors 152, and a plurality of vehicle systems 158. Sensors 152 and vehicle systems 158 can communicate with assist-mode detection/activation circuit 210 via a wired or wireless communication interface. Although sensors 152 and vehicle systems 158 are depicted as communicating with vacuum detecting/activation circuit 210, they can also communicate with each other as well as with other vehicle systems. Assist-mode detection/activation circuit 210 can be implemented as an ECU or as part of an ECU such as, for example electronic control unit 50. In other embodiments, assist-mode detection/activation circuit 210 can be implemented independently of the ECU.

Assist-mode detection/activation circuit 210 in this example includes a communication circuit 201, a decision circuit (including a processor 206 and memory 208 in this example) and a power supply 212. Components of vacuum sensing/activation circuit 210 are illustrated as communicating with each other via a data bus, although other communication in interfaces can be included. Vacuum sensing/activation circuit 210 in this example also includes a manual assist switch 205 that can be operated by the user to manually select vacuum sensing.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to vacuum sensing/activation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a assist-mode detection/activation circuit 210.

Communication circuit 201 either or both a wireless transceiver circuit 202 with an associated antenna 214 and a wired I/O interface 204 with an associated hardwired data port (not illustrated). As this example illustrates, communications with assist-mode detection/activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by assist-mode detection/activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or may not otherwise be included on a standard vehicle 10 with which the turn assist-mode system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, pressure sensors 222 to detect barometric pressure, sensors to detect the change in barometric pressure 224, left-right and front-rear slip ratio sensors 226, and environmental sensors 228 (e.g., to detect salinity or other environmental conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems.

During operation, vacuum sensing/activation circuit 210 can receive information from various vehicle sensors to determine whether vacuum sensing should be activated. Also, the driver may manually activate the assist mode by operating assists which 205. Communication circuit 201 can be used to transmit and receive information between vacuum sensing/activation circuit 210 and sensors 152, and vacuum sensing/activation circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of activating vacuum sensing. For example, as described in more detail below, communication circuit 201 can be used to send signals to, for example, one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3A:
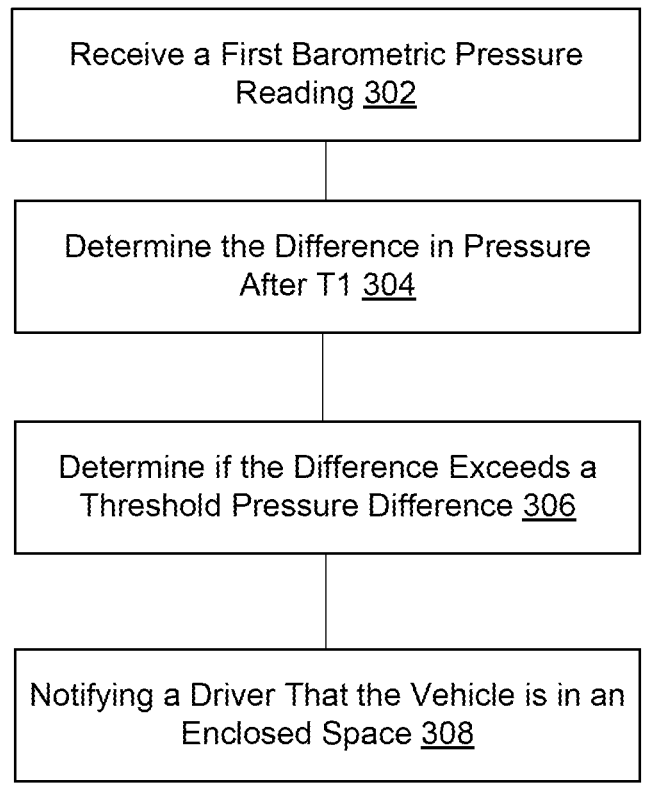
FIG. 3A illustrates an example method in accordance with the embodiments described herein.
Figure 3B:
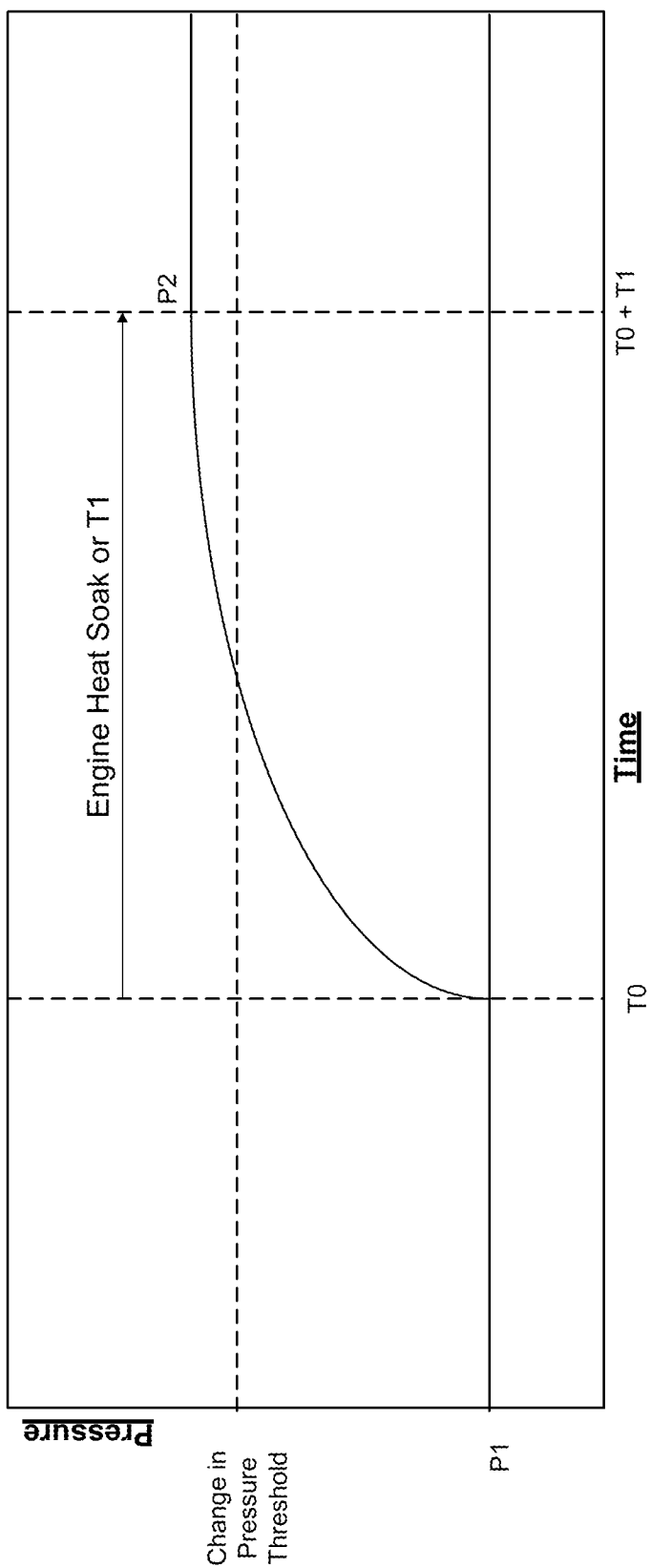
FIG. 3B illustrates an example plot for detecting an increase in pressure in accordance with the embodiments described herein.

FIGS. 3A and 3B illustrate an example method for a vehicle to execute upon ignition. As described above, a vehicle may have one or more sensors to detect the outside environment. As shown in FIG. 3A, at block 302, pressure sensors 224 may take a first barometric pressure reading. This may be done upon the driver activating the ignition, or may occur when the vehicle is already on. In some embodiments, a driver may be able to interact with a user interface to initiate pressure readings. In other embodiments, the first pressure reading may occur automatically at various intervals of a driving trip. These measurements may also be limited to occur only while the vehicle is parked, as is the most likely situation when the vehicle is in an enclosed space such as a garage, parking lot, or service center. These measurements may be programmed to occur based on driver preferences or based on system defaults. A second barometric pressure measurement can be taken. This measurement may occur after $T_1$ seconds, where $T_1$ represent a determined time that represents the time for the engine heat soak. An engine heat soak occurs where the engine increases in temperature without enough cooling to dissipate the heat, resulting in the rise in temperature. The engine heat soak time may be a set change in temperature of the vehicle, such that $T_1$ represents the amount of time it takes for the engine's temperature to increase a certain amount. In other embodiments, the vehicle may measure the change in temperature instead of the time it takes to increase a certain temperature. This may be a set value for a particular vehicle or model, or may be a time set by the driver or other user through the user interface. In other embodiments, $T_1$ can be automatically generated based on other environmental factors such as temperature, mileage, oil life, or other characteristics of the vehicle. After $T_1$ seconds, a second pressure measurement can be taken as occurred in block 302.

At block 304, the vehicle can determine the difference between the two pressure readings. This can be accomplished automatically by subtracting the first barometric pressure reading from the second barometric pressure reading. This determination may also occur with only one pressure reading based on the Ideal Gas Law, $$\text{i.e.} \frac{P_i V_i}{T_i} = \frac{P_i V_i}{T_i},$$

where $P_i$ and $P_f$ refers to the initial pressure and final pressure after $T_1$, $V_i$ and $V_f$ refer to the initial volume and final volume after $T_1$, and $T_i$ and $T_f$ refers to the initial temperature and the final temperature at $T_1$. $T_i$ can represent the current temperature and $T_f$ can reflect the increase in temperature due to the heat soak. Volume may be held as a constant, and $P_i$ may be the measured barometric pressure. The system can then determine $P_f$ and find the difference between $P_i$ and $P_f$. The difference may be stored in a table of values that record the first and second barometric pressure readings at various intervals. In some embodiments, the change in pressure can be recorded and graphed over time at determined equal intervals.

FIG. 3B illustrates an example plot in accordance with the determination in block 304. Here, P1 represents the first pressure reading taken. T0 represent the time where the engine begins the heat soak, such that the engine's temperature increases. After T1 seconds, where the engine's temperature increases by a set amount, a second pressure P2 is determined, either through calculating the final pressure or by taking a second pressure measurement. In the example of FIG. 3B, the difference between P1 and P2 exceeds a change in pressure threshold, as described below in FIG. 3A.

Referring back to FIG. 3A, at block 306, the vehicle can determine whether the difference exceeds a threshold pressure difference. This threshold pressure difference may be a determined value based on the characteristics of a vehicle in an enclosed space, or may be automatically generated based on the vehicle's geographical location. For example, at higher altitudes, the threshold pressure difference may be smaller due to the reduced barometric pressure. This threshold pressure difference may take into account the temperature of the environment and the vehicle to determine whether the pressure change is associated with an engine heat soak. As mentioned above, an engine heat soak occurs where the engine increases in temperature without enough cooling to dissipate the heat, resulting in the rise in temperature. Therefore, if the vehicle's engine increases in temperature past a threshold increase value, it can be inferred that the pressure change is associated with the engine heat soak. The vehicle may have an associated time for a heat soak, i.e. the time it takes for the engine's temperature to increase a threshold amount. In other embodiments, instead of measuring the time, the vehicle can take various temperature measurements to determine if the change in temperature reflects an engine heat soak. If the change in barometric pressure exceeds the threshold difference, the vehicle may determine that the vehicle is in an enclosed space. This determination can be made because the pressure would only increase in an enclosed space. If the vehicle turns on in an open space, the barometric pressure may barely change because the exhaust dissipates in a large volume of air. On the other hand, if the space is enclosed, the volume of the space is set and may be small enough to cause a larger change in pressure. Therefore, if the pressure increases by a threshold amount, the vehicle can be determined to be in an enclosed space. Otherwise, if the change in pressure does not exceed the threshold value, then the vehicle may determine that the vehicle is in an open space. This determination may be made at various intervals as described above. If the pressure readings and differences are graphed over time, a determination may be made at each equal interval as described above.

At block 308, the vehicle can notify the driver that the vehicle is in an enclosed space based on the determination described above. This can be accomplished through a display with a text based or other message to signify the issue. This display may also comprise a prompt to allow the driver to turn off the vehicle. This prompt may contain an actuation mechanism such as a button that can turn off the vehicle. Alternatively, the vehicle may automatically turn off upon notifying the driver, or place the vehicle into an accessory mode such that the engine turns off. In other embodiments, the determination may be made while the vehicle is being turned on. In this instance, the vehicle may refrain from activating the ignition and may notify the driver that the engine is not activated due to the determination that the vehicle is in an enclosed space and/or that the difference in pressure exceeds the threshold pressure difference.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 400. After reading this description, it will become apparent to a person skilled in the relevant art how to implement the application using other computing components or architectures.

Figure 4:
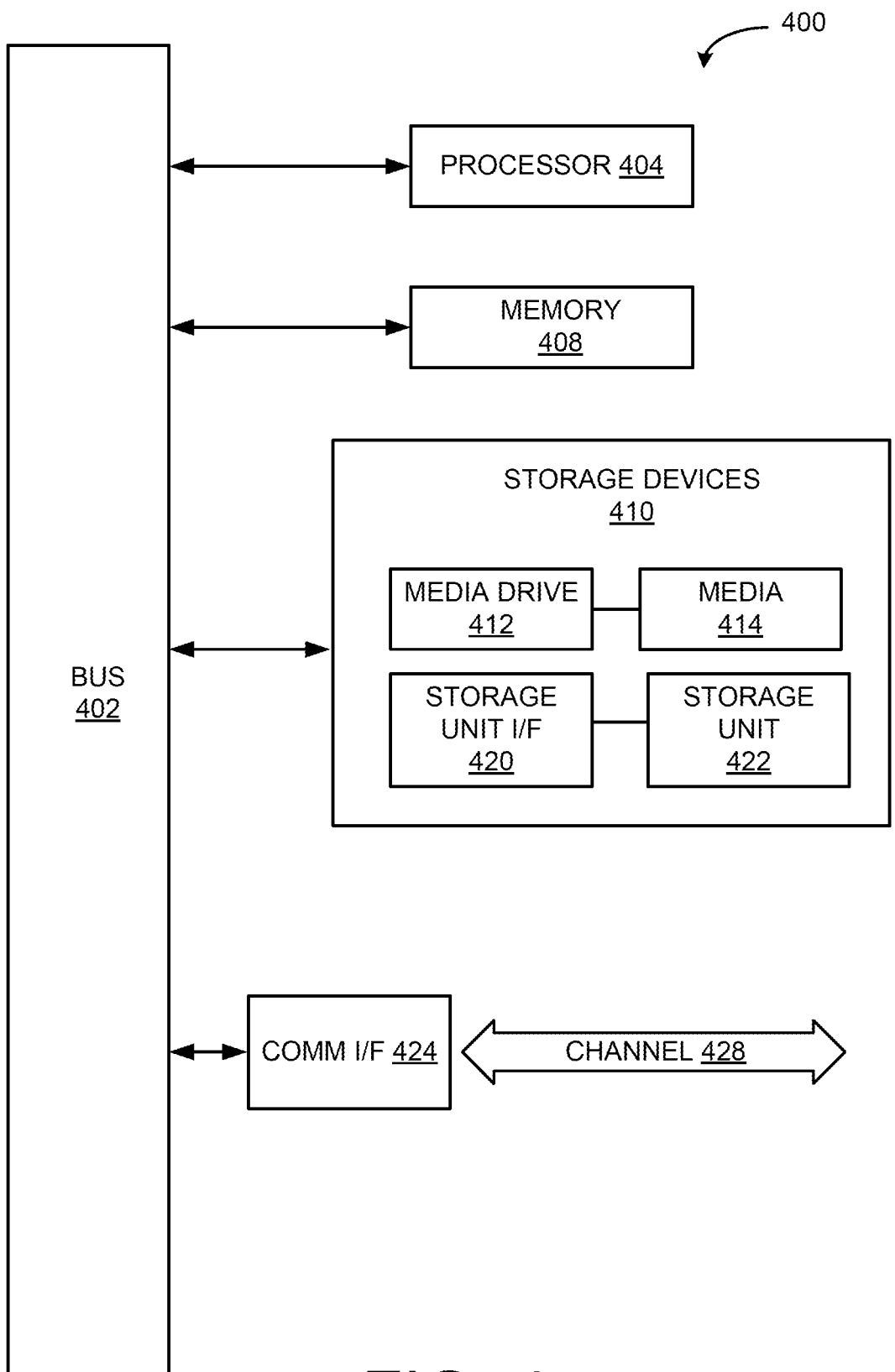
FIG. 4 is an example computing component that may be used to implement various features of embodiments described in the present disclosure.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid-state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
 a plurality of sensors, wherein at least one sensor comprises a barometric pressure sensor;

a processor; and a memory encoded with instructions executable by the processor, the instructions causing the processor to:

receive a first barometric pressure reading from the plurality of sensors;

determine a second barometric pressure;

determine a difference between the first barometric pressure reading and the second barometric pressure;

determine that the difference exceeds a threshold pressure difference value;

determine that the vehicle is in an enclosed space based on the difference exceeding the threshold pressure difference value; and notify a driver of the vehicle that the vehicle is in the enclosed space.

2. The vehicle of claim 1, wherein the instructions further cause the processor to determine if the driver is activating the vehicle and refrain from activating the vehicle if the difference exceeds the threshold pressure difference value.

3. The vehicle of claim 1, wherein determining the second barometric pressure comprises receiving a second barometric pressure reading from the plurality of sensors.

4. The vehicle of claim 1, wherein the instructions further cause the processor to determine if the vehicle is activated and automatically turn off the vehicle if the difference exceeds the threshold pressure difference value.

5. The vehicle of claim 1, wherein notifying the driver of the vehicle comprises displaying a message to the driver and providing a prompt to turn the vehicle off.

6. The vehicle of claim 1, wherein the threshold pressure difference value is calculated based on the first barometric pressure reading, the second barometric pressure, and a time interval between the first barometric pressure reading and the second barometric pressure reading.

7. The vehicle of claim 6, wherein the time interval is determined based on the vehicle's heat soak time.

8. A method, comprising:

determining that a vehicle has been turned on;

receiving a first barometric pressure reading from one or more sensors of the vehicle;

receiving a second barometric pressure reading from the one or more sensors after a determined time;

determining a difference between the first barometric pressure reading and the second barometric pressure reading;

determining if the difference exceeds a threshold pressure difference value;

determining that the vehicle is in an enclosed space based on the difference exceeding the threshold pressure difference value;

notifying a driver of the vehicle that the vehicle is in an enclosed space; and providing a prompt to the driver of the vehicle to turn the vehicle off when the vehicle is in the enclosed space.

9. The method of claim 8, wherein the threshold pressure difference value is calculated based on the first barometric pressure reading, the second barometric pressure, and the determined time.

10. The method of claim 8, wherein the determined time is based on the vehicle's heat soak time.

* * * * *